United States Patent
Dillard et al.

(10) Patent No.: US 7,590,226 B2
(45) Date of Patent: Sep. 15, 2009

(54) TELEPHONE MESSAGE SYSTEM AND METHOD

(75) Inventors: John T. Dillard, Salem, OR (US);
Duane A. Klein, Henderson, NV (US);
Gary Frost, Derwent (CA)

(73) Assignee: Enhanced Telecommunication Services LLC, Henderson, NV (US)

( * ) Notice: Subject to any disclaimer, the term of this patent is extended or adjusted under 35 U.S.C. 154(b) by 1036 days.

(21) Appl. No.: 10/844,050

(22) Filed: May 11, 2004

(65) Prior Publication Data

US 2004/0247097 A1    Dec. 9, 2004

Related U.S. Application Data

(60) Provisional application No. 60/470,516, filed on May 13, 2003.

(51) Int. Cl.
*H04M 1/64* (2006.01)
*H04M 3/42* (2006.01)

(52) U.S. Cl. .................. 379/88.17; 379/69; 379/207.03

(58) Field of Classification Search ............... 379/88.17
See application file for complete search history.

(56) References Cited

U.S. PATENT DOCUMENTS

| | | | |
|---|---|---|---|
| 5,768,513 A | | 6/1998 | Kuthyar et al. |
| 5,805,587 A | | 9/1998 | Norris et al. |
| 5,832,221 A | | 11/1998 | Jones |
| 5,841,966 A | | 11/1998 | Irribarren |
| 5,963,618 A | * | 10/1999 | Porter ..................... 704/270.1 |
| 6,002,751 A | * | 12/1999 | Shaffer ..................... 379/88.18 |
| 6,215,858 B1 | | 4/2001 | Bartholomew et al. |
| 6,304,565 B1 | | 10/2001 | Ramamurthy |
| 6,304,573 B1 | | 10/2001 | Hicks, III |
| 6,304,636 B1 | | 10/2001 | Goldberg et al. |
| 6,324,265 B1 | | 11/2001 | Christie, IV et al. |
| 6,350,066 B1 | | 2/2002 | Bobo, II |
| 6,381,320 B1 | | 4/2002 | Creamer et al. |
| 6,434,143 B1 | | 8/2002 | Donovan |
| 6,442,245 B1 | | 8/2002 | Castagna et al. |
| 6,477,246 B1 | | 11/2002 | Dolan et al. |
| 6,697,458 B1 | * | 2/2004 | Kunjibettu ............... 379/88.17 |
| 6,731,625 B1 | * | 5/2004 | Eastep et al. ................. 370/352 |
| 6,775,360 B2 | * | 8/2004 | Davidson et al. ......... 379/88.14 |
| 6,792,085 B1 | * | 9/2004 | Rigaldies et al. ......... 379/88.13 |
| 6,999,566 B1 | * | 2/2006 | Eason et al. ............. 379/88.22 |
| 2002/0013141 A1 | * | 1/2002 | Cox et al. .................... 455/409 |
| 2002/0073207 A1 | * | 6/2002 | Widger et al. ............... 709/227 |
| 2003/0014733 A1 | * | 1/2003 | Ringseth et al. ............. 717/116 |
| 2003/0040304 A1 | * | 2/2003 | Cox et al. .................... 455/414 |
| 2003/0147518 A1 | * | 8/2003 | Albal et al. ............ 379/207.15 |

* cited by examiner

*Primary Examiner*—Curtis Kuntz
*Assistant Examiner*—Joseph T Phan
(74) *Attorney, Agent, or Firm*—Kolisch Hartwell, PC

(57) ABSTRACT

A telephone message system accessible to a calling party attempting to reach a called party is disclosed. The system includes a carrier switch configured to route telephone calls via a public switched telephone network, and a message server associated with the calling party and independent of the called party, wherein the message server is configured to record a message from the calling party and to deliver the message to the called party, and wherein the carrier switch is configured to selectively route the calling party to the message server.

15 Claims, 4 Drawing Sheets

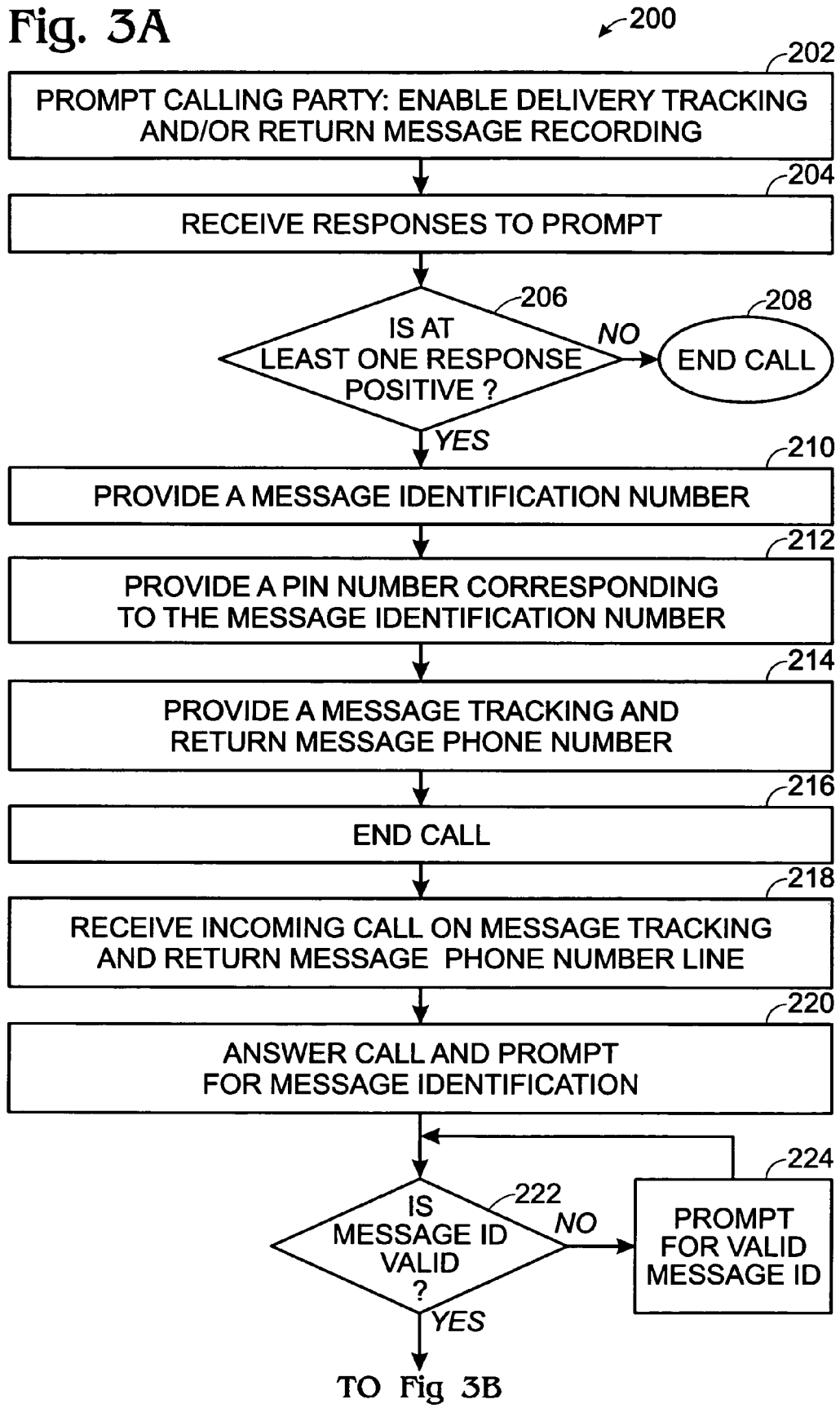

TELEPHONE MESSAGE SYSTEM AND METHOD

CROSS-REFERENCE TO RELATED APPLICATIONS

This application claims priority under 35 U.S.C. 119(e) to U.S. Provisional Patent Application Ser. No. 60/470,516 entitled "Telephone Message Delivery System and Method," filed May 13, 2003, the entire disclosure of which is hereby incorporated by reference for all purposes.

TECHNICAL FIELD

This invention relates generally to messaging, and more particularly to telephone message delivery systems and methods.

BACKGROUND

Telephone systems have employed voice mail or similar message technology for quite some time. Voice mail and messaging technology enables a called party to receive a message when they do not answer their telephone. The called party can retrieve the message at some later point in time.

Initially, the answering machine presented a called party with a way to record messages when they were unavailable to answer the telephone. Typically, the answering machine makes an analog recording of the calling party's message. Most answering machines are devices that plug into a telephone jack at the called party's location. Newer versions of answering machines allow for digital recording of messages and may even permit multiple mailboxes to be set up on a single telephone line.

More recently, telephone companies have offered digital voice mail services. A customer of the telephone company can subscribe to a digital voice mail service and have messages recorded by the telephone company that they can retrieve from their home telephone or from a telephone away from their home. Computer software and other hardware have been developed to provide called parties with a variety of voice messaging capabilities.

Not all telephone users subscribe to voice mail services or have answering machines. If a called party does not have a voice mail service or an answering machine, a calling party cannot leave a message for the called party. In some situations it may be desirable to provide a calling party with the ability to leave a voice message for the party being called, even when the called party does not have a voice mail service (or is not associated with such a service), an answering machine, or a message recording device.

SUMMARY

One embodiment provides a telephone messaging system accessible to a calling party attempting to reach a called party. The system includes a carrier switch configured to route telephone calls via a public switched telephone network, and a message server associated with the calling party and independent of the called party, wherein the message server is configured to record a message from the calling party and to deliver the message to the called party, and wherein the carrier switch is configured to selectively route the calling party to the message server.

DETAILED DESCRIPTION

Figure 1:
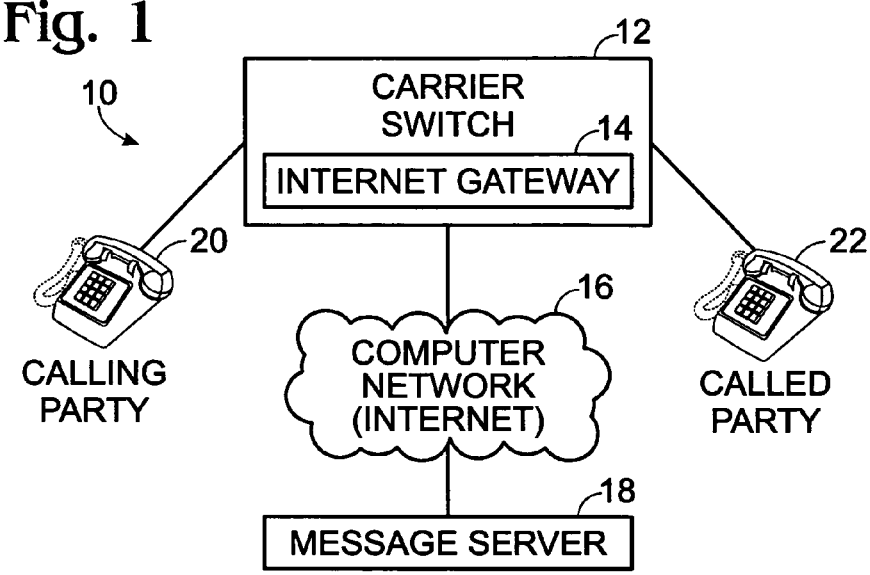
FIG. 1 is a schematic representation of an embodiment of a message system according to the present description.

An embodiment of a telephone message system according to the present description is generally indicated at 10, in FIG. 1. System 10 includes a carrier switch 12, which may be configured to route telephone calls on a public switched telephone network (PSTN). Carrier switch 12 may include a computer network gateway 14 configured to provide access to a computer network 16. A message server 18 may be connected to computer network 16 and configured to manage and store recorded voice messages.

System 10 includes a calling party 20 and a called party 22 each connected to a PSTN. It will be understood that the system will work with any calling party and called party with telephone services that access a PSTN. It will be further understood, that while FIG. 1 illustrates the calling party and called party with telephones, other communication devices may be used including cell phones and similar communications devices configured to access public switched telephone networks directly or indirectly.

Carrier switch 12 may be configured to complete calls over a PSTN between two telephones or other devices, as described above. Carrier switch 12 may further include a computer network gateway 14 that may be enabled to communicate between telephones on the PSTN and computer network 16. Typically, a large number of telephone lines, referred to as trunks, connect the PSTN to the switch. Switch 12 may be a digital switch, although an analog or circuit-based switch also may be used. Redundant switching devices may be employed to improve telephone network reliability.

Computer network gateway 14 may enable communication both from the PSTN to the computer network and from the computer network to the PSTN. Computer network gateway 14 also may enable voice communication with Voice over Internet Protocol (VoIP) for communicating between the PSTN and message server 18 over computer network 16.

Computer network 16 may be a dedicated Ethernet connection, or other type of packet switched network with guaranteed minimum data transfer rates. Computer network 16 also may be a private Local Area Network (LAN), a private Wide Area Network (WAN), a public computer network, such as the Internet, or virtually any other network capable of transmitting data between computers, which may or may not utilize guaranteed minimum data transfer rates.

Message server 18 may be any suitable computer system, which may include a processor, memory, storage media, and/or communications hardware configured to process voice message data. Processing voice message data may include recording or storing voice messages, attempting to deliver voice messages, and/or delivering voice messages. Message server 18 may be a single server or a network of servers configured to process voice message data.

Message server 18 typically will be associated with calling party 20. Associated with, as used herein, means that calling party 20 has subscribed, enrolled, registered, joined, and/or otherwise associated with the message server, either directly or indirectly, so that the message server may store the calling party's message, deliver that message to the called party, provide status information regarding delivery of that message to the called party, and/or provide a return message from the called party. Called party 22 need not be associated with message server 18. In other words, the calling party initiates or establishes some connection or relationship with the message server. The relationship between calling party 20 and message server 18 may have been created previously. Alternatively, or additionally, the relationship may be created dynamically (or on-the-fly) and need not have been created previously. The relationship between calling party 20 and message server 18 is independent of, and does not depend on, any relationship between called party 22 and message server 18.

System 10 may be implemented as here described. A call initiated by calling party 20 typically connects to switch 12 initially where that call is routed to called party 22. If called party 22 answers, then the call is completed normally and switch 12 connects the two callers so that they can have a telephone conversation.

If the called party does not answer, or the call is not completed normally because of a busy signal or other network conditions, then the switch routes or connects calling party 20 to the message server. The message server asks calling party 20 if they would like to leave a message for called party 22 to be delivered at a future time. If calling party 20 responds that they would like to leave a message, then the message server records the message to be delivered later.

Network gateway 16 may establish a VoIP link between calling party 20 and message server 18, so that calling party 20 may record a message on message server 18. The recorded message (or originating message) on message server 18 may have a defined format including a data header, a time stamp, a separate name prompt, as well as the body of the message. In addition to routing the calling party's message to message server 18, carrier switch 12 may include data header information with the message. The data header information may provide message server 18 with the carrier switch identification and the called number information, so that message server 18 can attempt to deliver the message back through carrier switch 12 to the called party at a future point in time.

Message server 18 may be configured to record messages, store messages, play messages, and/or deliver messages to called parties, such as called party 22. Additionally, message server 18 may generate, store, and/or send billing information. Typically, message server 18 records voice messages in a digital format to facilitate transmission of the messages over computer network 16. Information in the data header of a recorded message may identify the carrier switch and may enable message server 18 to bill the owner of the carrier switch for the service of recording, storing, playing, and/or delivering the voice messages for that carrier switch owner's customer. The message server may deliver messages stored thereon at predetermined intervals of time between specified acceptable hours.

Message server 18 may deliver messages using a Session Initiated Protocol (SIP). The SIP may generate a call from message server 18 to called party 22 by using VoIP to contact carrier switch 12. Message server 18 also may apply parameters to delivery of the message to the called party. Those parameters may be selected by the calling party. The parameters may include the actual time for delivery of a message to the called party, the times when the message server should suspend attempts to deliver the message, the time intervals between attempts to deliver the message, and/or other suitable parameters. Additionally, message server 18 may keep track of local time of the called party and adjust the parameters based on that time. Furthermore, message server may be configured not to attempt to deliver the message if the local time is "too late" or "too early." For example, after 12:00 midnight or before 6:00 a.m. at the location of the called party, message server 18 suspends attempts to deliver the message until after 6:00 a.m.

When all calling party parameters on the time of delivery have been satisfied, carrier switch 12 attempts to connect message server 18 to called party 22. If called party 22 answers the call, then message server 18 delivers the message to called party 22. If called party 22 does not answer, the predetermined time interval passes and message server 18 makes another attempt to contact the called party, provided the "too late" and/or "too early" parameter has not been exceeded by the passage of that time interval.

Message server 18 may provide called party 22 the option of leaving a return message for calling party 20. The message server may store that return message for later retrieval by the calling party and/or may deliver the return message to the calling party by any suitable method. Retrieval of the return message may occur by any suitable method, including the method discussed below. Delivery of the return message also may occur by any suitable method, including opening a SIP and sending the return message to the calling party via VoIP, as discussed above. Message server 18 also may allow the called party to select parameters to delivery of the return message similar to the parameters discussed above.

Figure 2A:
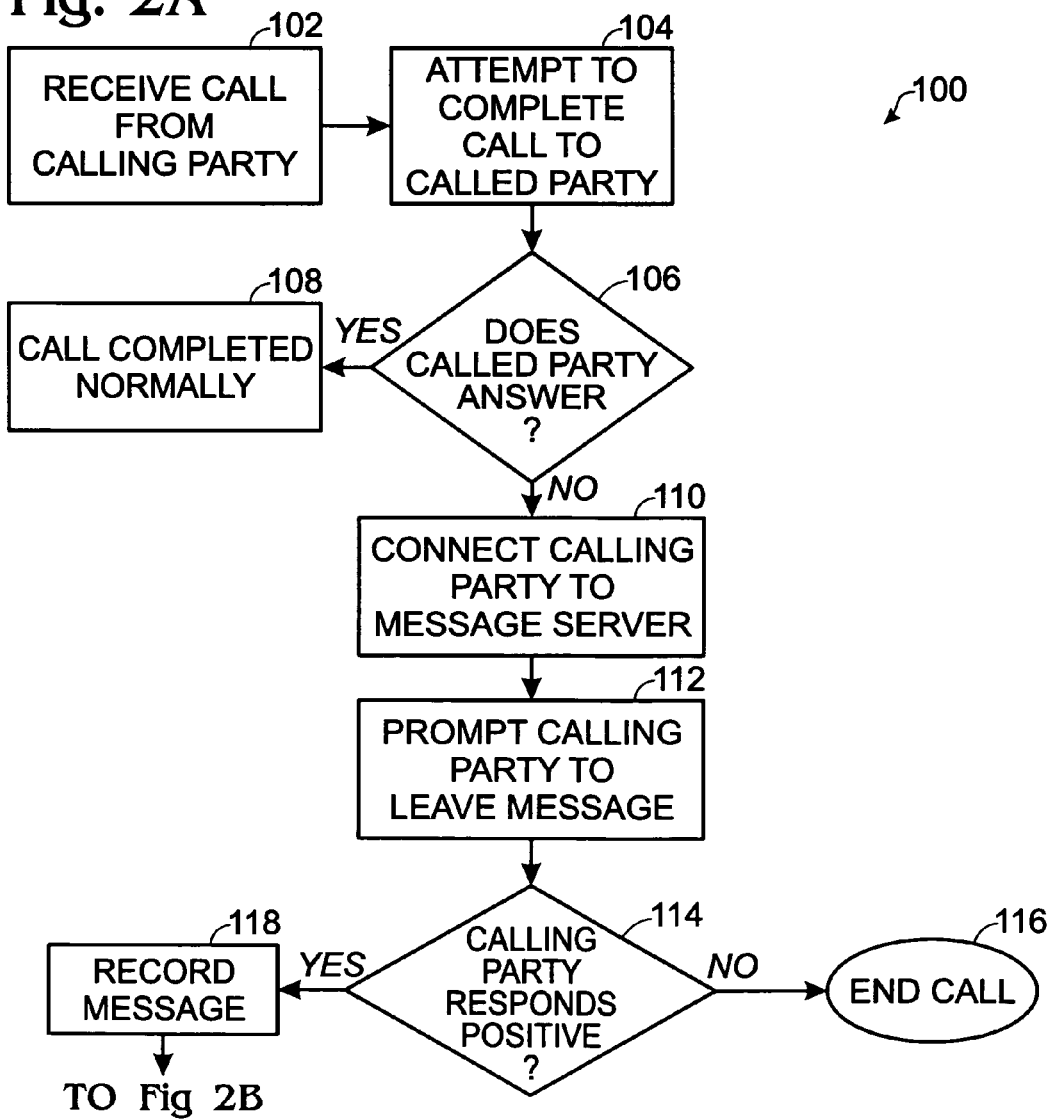
FIG. 2 is a flow chart describing an exemplary method of messaging according to the present description.
Figure 2B:
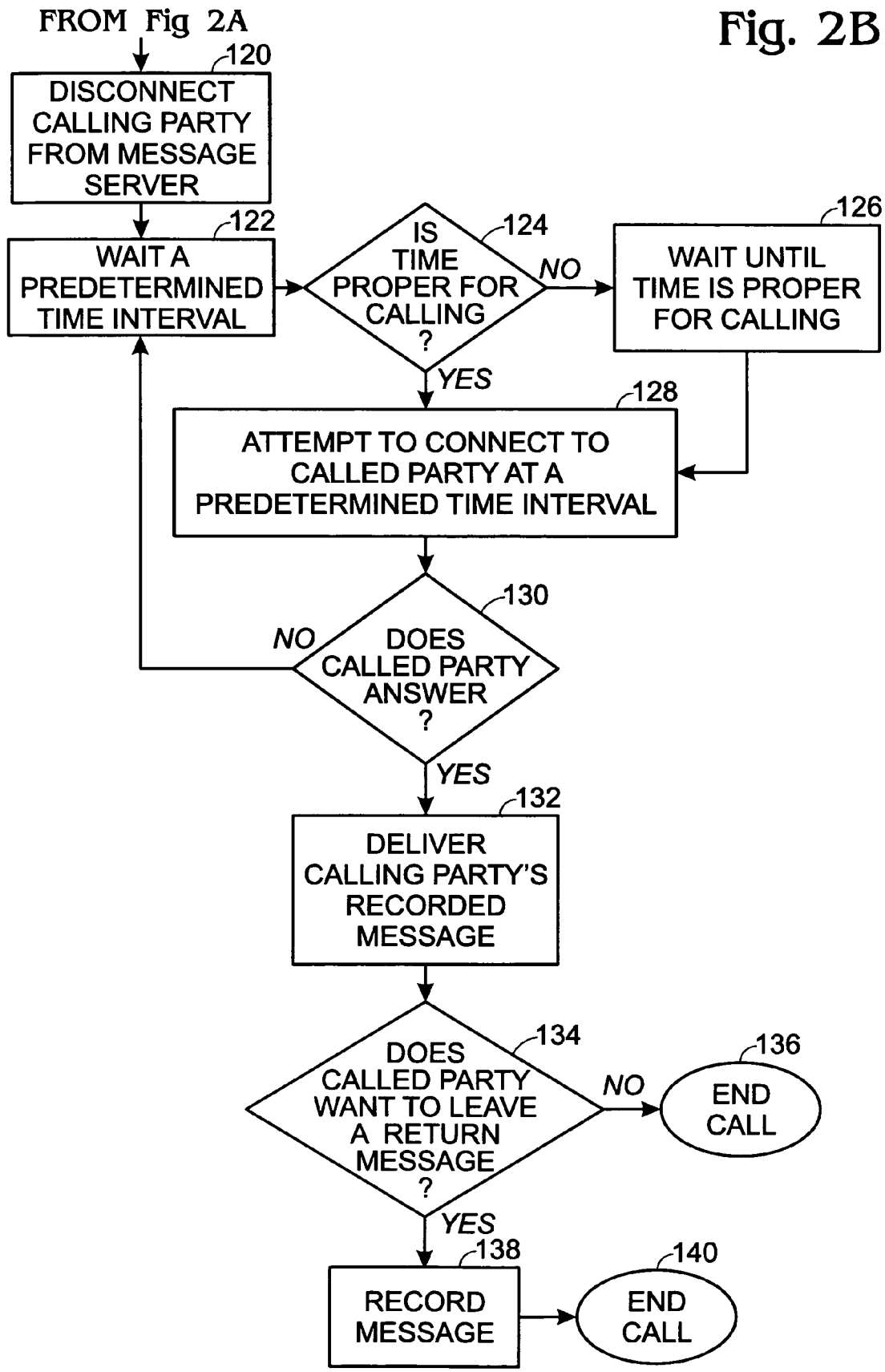

A flow chart describing an exemplary method of implementing a message system is indicated generally at 100, in FIG. 2. The method is described from the context of the system illustrated in FIG. 1.

Initially, a carrier switch receives a call from a calling party, as indicated at 102. The carrier switch attempts to complete the call to the called party, as indicated at 104. The carrier switch awaits an answer at the called party's telephone, as indicated at 106. If the called party answers, the call is completed normally and the calling party communicates with the called party, as indicated at 108.

The carrier switch connects the calling party to the message server, as indicated at 110, in the event of any one or more of the following conditions: completion of a preset number of rings (for example 10) without an answer, expiration of a preset elapsed time, receipt of a busy signal from the called party's telephone, and/or any other suitable condition that corresponds to an unsuccessful attempt to reach the called party. The message server then prompts the calling party to leave a message for future delivery, as indicated at 112. The message server checks for a positive response to the prompt for leaving a message, as indicated at 114. If the message server receives a negative response, then the call is ended, as indicated a 116

It should be noted that the carrier switch may connect the calling party to the message server may occur using VoIP over a computer network, such as the Internet. The connection process may include sending data header information to the message server, which may identify the carrier switch initiating the connection. Other important data, including the called party's number, the billing information for the carrier switch, and/or other suitable data also may be sent to the message server.

After the connection has been established and the header data sent to the message server, the calling party records a message over the VoIP connection to the message server, as indicated at 118. After the message has been recorded, the message server may prompt the calling party to set one or more delivery parameters as described above, including time limits for "too late" to deliver the message and "too early" to deliver the message, as well as the time interval for attempting to deliver the message, and/or other suitable parameters.

It will be understood that additional prompts to the calling party setting parameters on the deliver of the message are optional and may not be required. In the absence of responses to these prompts, or in lieu of prompting the calling party at all, default parameters may be established by the message server and/or the carrier switch. In the case where defaults are set by the carrier switch, this information may be included in the data header.

After obtaining all the needed data from the calling party, either the message server or the carrier switch disconnects the calling party from the message server, as indicated at 120. The message server then waits the appropriate amount of time for a predetermined time interval to elapse, as indicated at 122.

After the predetermined time interval has elapsed, the message server checks to determine if it is a proper time for calling the called party, as indicated at 124. If it is not the proper time for attempting to call the called party, the message server waits until that time before attempting to call the called party, as indicated at 126. If it is the proper time for attempting to call the called party, the message server attempts to call the called party, as indicated at 128.

The message server checks for an answer at the called party, as indicated at 130. If the calling party does not answer, the message server waits the predetermined time interval, as indicated at 122. If the calling party does answer, the message server delivers the message to the called party, as indicated at 132. After delivering the message, the message server may give the called party the option of leaving a return message, as indicated at 134. If the called party does not want to leave a return message then the call ends, as indicated at 136. If, however, the called party wants to leave a return message then the message server records the return message, as indicated at 138. After storing the return message the call ends, as indicated at 140.

Figure 3B:
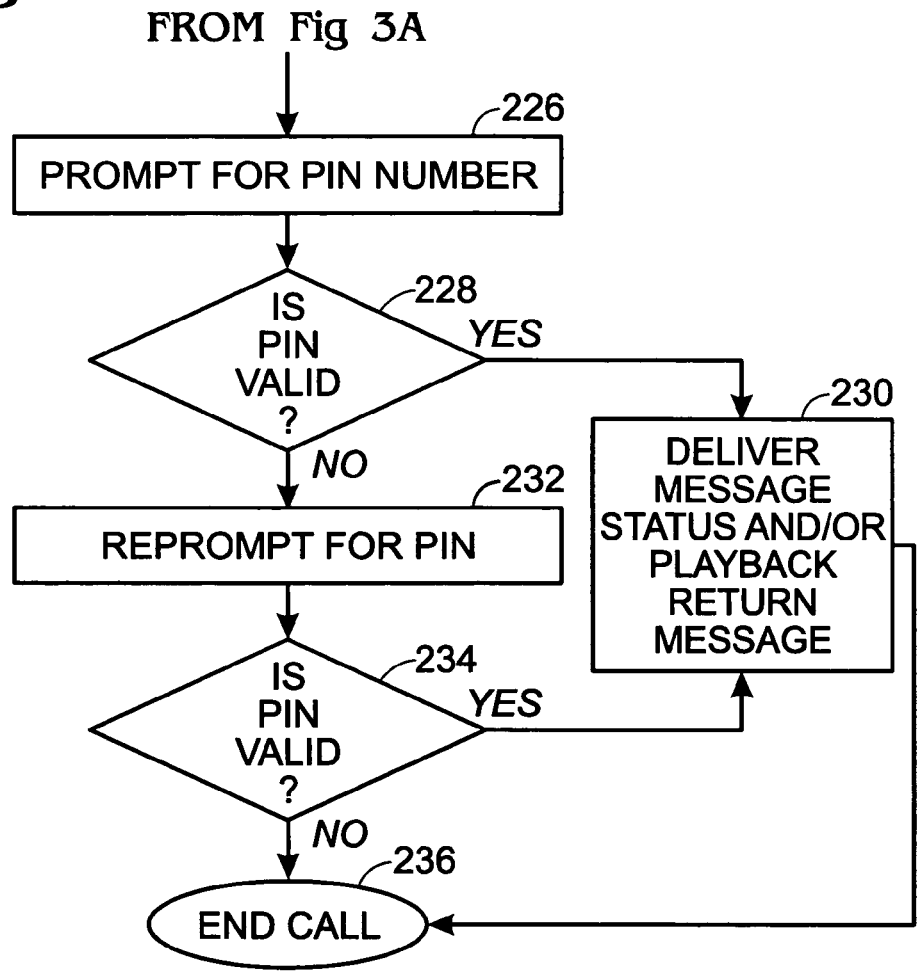
FIG. 3 is a flow chart describing an exemplary method of tracking a message to be delivered to a called party and/or playing a return message from the called party.

FIG. 3 illustrates a method for a calling party to check the status of a message that the calling party has left for a called party and/or retrieve the return message from the called party, the method generally indicated at 200. After the calling party records a message on the message server, the server prompts the calling party, asking if the calling party would like to enable delivery features for the message recorded, such as delivery tracking and/or return message recording, as indicated at 202.

The message server receives responses to the enable delivery features prompt, as indicated at 204. The message server checks the responses to determine if there is at least one positive response, as indicated at 206. If there is no positive response, then the message server terminates the call, as indicated at 208.

If, however, at least one response is positive, the message server provides the calling party with a message identification number, as indicated at 210. The message identification number is assigned to the message by the message server using any suitable algorithm configured to assign each message to a unique message specific identification number.

The message server also provides the calling party with a unique access code or personal identification number (PIN), as indicated at 212. The PIN may be specific for, and corresponds to, only the message identification number for the recorded message of the calling party.

The calling party receives a message tracking phone number that the calling party can use to check the status of the message, as indicated at 214. The calling party may use the message tracking phone number provided by the message server to call the message server directly and check on the status of the message left for the called party and/or retrieve the return message from the called party, as will be explained in more detail below.

The connection with the calling party ends after the calling party has received the message identification number, the PIN, and/or the message tracking phone number, as indicated at 216. The calling party armed with the information provided by the message server; namely, the message identification number, the PIN, and/or the message tracking phone number, may call the message tracking phone number and receive status information regarding the delivery of the recorded message and/or retrieve the return message from the called party.

The message server at some point later receives an incoming call on the message tracking phone number line, as indicated at 218. The message center answers the incoming call and prompts the caller for a message identification number, as indicated at 220. The caller may be calling party 20, called party 22, or any other party. After the caller enters the message identification number, the message server verifies that the message identification number is valid and that the message server has a message that has been assigned that identification number, as indicated at 222.

If the message server receives an invalid message identification number, then it prompts the caller again for a valid message identification number, as indicated at 224. For example, by sending the caller a message saying "You have entered an invalid message identification number please enter another." The loop is continued until the caller enters the valid message identification number or hangs up.

After the message server has received a valid message identification number, the server prompts the caller for the corresponding PIN, as indicated at 228. The caller then enters the PIN. If the PIN matches the message identification number, then the server reports to the caller the message status information and/or plays any return message from the called party, as indicated at 230. The message status information may include the time the message was last attempted to be delivered, the number of times the message server has attempted to deliver the message, the time the message was actually delivered, and/or any other suitable status information.

If the PIN received by the message server is not valid, the message server re-prompts the caller to enter a valid PIN, as indicated at 232. When the caller reenters the PIN, the message server checks to see if the newly entered PIN is valid and matches the message identification number, as indicated at 234. If the PIN is valid, the message delivery status information and/or return message is provided to the caller, as indicated at 230. If the second attempt to enter the correct PIN is not the PIN corresponding to the message identification number, then the message server terminates the call with the caller, as indicated at 236.

Alternatively, or additionally, message server 18 may be configured to deliver status information to calling party 20. Delivery of the status information may occur by any suitable method, including opening a SIP and sending the status information to the calling party via VoIP, as discussed above. The calling party may be able to select when message server 18 delivers the status information, such as when the message server has successfully delivered the message to the called party or after the message server has exceeded a preset number of delivery attempts. Furthermore, the steps illustrated in FIGS. 2 and 3 may be performed in different sequences and in different combinations, not all steps being required for all examples.

It will be understood that a variety of systems may be used to implement a telephone message system, such as that disclosed herein. Such systems may include message servers located at the carrier switch, as opposed to at a remote location connected to the carrier switch via a computer network. Advances in carrier switch technology may enable all of the functions of the message server to be incorporated into the carrier switch.

Similarly, as illustrated herein, the message server was depicted as a single server, however, it will be understood that multiple servers may be employed to achieve the same result. To optimize the efficiency of storing messages a plurality of message servers may be deployed at different geographic locations to reduce the travel distance of VoIP communications.

It is believed that the disclosure set forth above encompasses multiple distinct inventions with independent utility. While each of these inventions has been disclosed in its preferred form, the specific embodiments thereof, as disclosed and illustrated herein, are not to be considered in a limiting sense as numerous variations are possible. The subject matter of the inventions includes all novel and non-obvious combinations and sub-combinations of the various elements, features, functions, and/or properties disclosed herein. Where claims recite "a" or "a first" element or equivalent thereof, such claims should be understood to include incorporation of one or more such elements, neither requiring, nor excluding two or more such elements.

It is believed that the following claims particularly point out certain combinations and sub-combinations that are directed to one of the disclosed inventions and are novel and non-obvious. Inventions embodied in other combinations and sub-combinations of features, functions, elements, and/or properties may be claimed through amendment of those claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

We claim:

1. A telephone message system accessible to a calling party attempting to reach a called party, comprising:
   a carrier switch configured to route telephone calls via a public switched telephone network; and
   a message server associated with the calling party and not associated with the called party, wherein the message server is configured to store a message from the calling party and to deliver the message to the called party, and
   wherein the carrier switch is configured to selectively route the calling party to the message server and the message server is configured to selectively provide the calling party with status information regarding delivery of the message,
   wherein the message server is configured to allow the calling party to apply at least one parameter to delivery of the message to the called party,
   wherein the at least one parameter includes one or more actual times for delivery,
   wherein the message server is configured to adjust the one or more actual times for delivery to local time of the called party wherein the message server is configured to allow the called party to leave a return voice message for the calling party,
   wherein the message server is configured to allow the calling party to retrieve the return voice message, and
   wherein delivery of the return voice message occurs by the called party opening a SIP and sending the return message to the calling party via VoIP.

2. The system of claim 1, wherein the carrier switch is configured to route the calling party to the message server upon satisfaction of a condition corresponding to an unsuccessful attempt to reach the called party.

3. The system of claim 2, wherein the carrier switch is configured to route the calling party to the message server after completion of a preset number of rings without an answer from the called party.

4. The system of claim 2, wherein the carrier switch is configured to route the calling party to the message server after expiration of a preset elapsed time.

5. The system of claim 2, wherein the carrier switch is configured to route the calling party to the message server upon receipt of a busy signal.

6. The system of claim 1, wherein the message server is configured to deliver the message to the called party via voice over internet protocols.

7. The system of claim 1, wherein the message server is configured to transmit billing information.

8. The system of claim 1, wherein the status information includes whether the message server has delivered the message to the called party.

9. The system of claim 1, wherein the status information includes number of times the message server has attempted to deliver the message to the called party.

10. The system of claim 1, wherein the message server is configured to require an access code before the calling party can obtain status information.

11. A telephone message system accessible to a calling party attempting to reach a called party, comprising:
   a carrier switch configured to route telephone calls via a public switched telephone network;
   a voice message server associated with the calling party and not associated with the called party, wherein the voice message server is configured to store a voice message from the calling party and to deliver the voice message to the called party via voice over internet protocols;
   a computer network configured to allow communication between the carrier switch and the voice message server,
   wherein the carrier switch is configured to route the calling party to the voice message server upon satisfaction of a condition corresponding to an unsuccessful attempt to reach the called party and wherein the voice message server is configured to receive from the calling party parameters to delivery of the voice message to the called party, the parameters including at least one of one or more time intervals between attempts to deliver the message and one or more times where the message server suspends attempts to deliver the message,
   wherein the voice message server is configured to allow the calling party to obtain status information regarding delivery of the voice messages,
   wherein the status information includes at least one of whether the voice message server has delivered the voice message to the called party and number of times the voice message server has attempted to deliver the voice message to the called party wherein the voice message server is configured to allow the called party to leave a return voice message for the calling party,
   wherein the voice message server is configured to allow the calling party to retrieve the return voice message, and wherein delivery of the return voice message occurs by the called party opening a SIP and sending the return message to the calling party via VoIP.

12. The system of claim 11, wherein the carrier switch is configured to route the calling party to the voice message server upon at least one of a preset number of rings without an answer from the called party, expiration of a preset elapsed time, and receipt of a busy signal.

13. The system of claim 11, wherein the voice message server is configured to transmit billing information.

14. The system of claim 11, wherein the computer network includes at least one of an Ethernet connection, a private local area network, a private wide area network, and a public computer network.

15. The system of claim 11, wherein the voice message server is configured to deliver the return voice message to the calling party.

\* \* \* \* \*